UNITED STATES PATENT OFFICE.

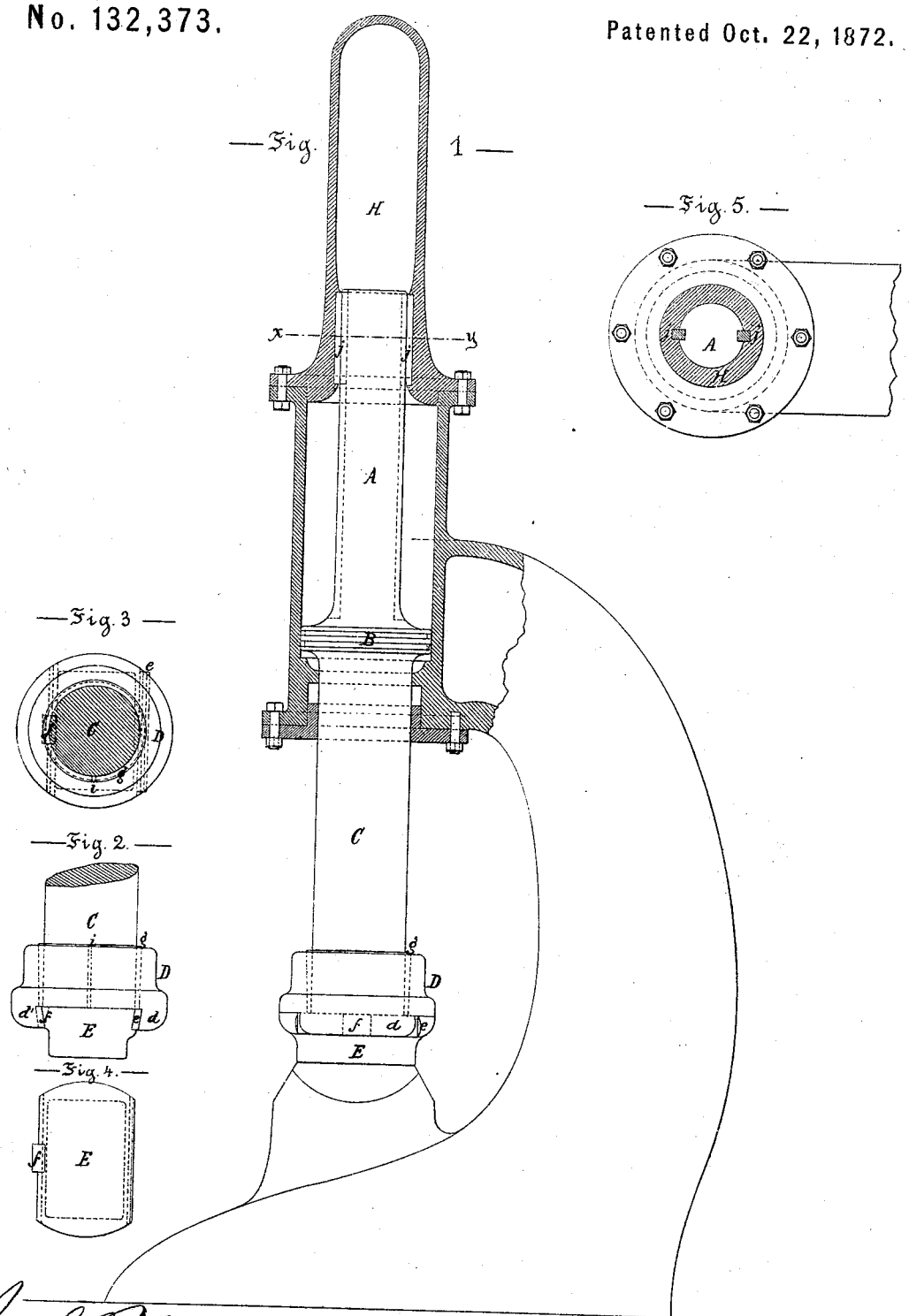

WILLIAM SELLERS, OF PHILADELPHIA, PENNSYLVANIA.

IMPROVEMENT IN STEAM-HAMMERS.

Specification forming part of Letters Patent No. 132,373, dated October 22, 1872.

*To all whom it may concern:*

Be it known that I, WILLIAM SELLERS, of the city and county of Philadelphia, in the State of Pennsylvania, have invented certain new and useful Improvements in Steam-Hammers, of which improvements the following is a specification:

My invention relates to that class of direct-acting steam-hammers in which the piston and piston-rod are combined in what is technically called the hammer-bar, and which forms the part of the hammer which delivers the blow.

The object of the first part of my invention is to enhance the efficiency of the blow and at the same time to increase the strength and durability of the hammer-bar in the parts most liable to be injured by the concussion; and to this end I make that part of the piston-rod or hammer-bar which is below the piston, and which delivers the blow, of greater diameter than that part which is above the piston, so that with any given weight of hammer-bar the greater bulk of metal is nearest to the point of percussion, while the upper part of the piston-rod or hammer-bar, which acts mainly as a guide, is reduced to a diameter simply commensurate with its requirements to resist lateral and torsional strains and to prevent the hammer-bar from turning in the cylinder. The pyramidal, which is the true geometrical figure best adapted for delivering an end blow with the minimum of injurious effect upon itself, is thus approximated in my improved hammer-bar as nearly as may be consistently with the practical functions it performs, and in this, as in the pyramidal shape, the successive layers of the entire mass will receive or sustain the concussion of the blow in proportion to their relative areas from base to apex. It is the object of the second part of my invention to make the head which holds the hammer-face or die separate from the hammer-bar, and, while providing for its secure attachment to the bar, at the same time make it readily detachable and adjustable in any desired position relative to or about the axis of the bar, and this without reducing the size of the hammer-bar or impairing its strength by making cuts or key-ways in it. Heretofore, in this class of steam-hammers, where the head has been made separate from the bar, the end of the bar has been tapered to correspond with a tapering socket in the head. The following objections exist against this mode of fastening: If the head be so fitted to the tapering shank of the bar as to let the shank have a bearing on the sides of the socket without touching at the bottom, the momentum of the bar in delivering the blow will drive the bar so tight into the socket as to make it almost impossible to separate the two by ordinary means; or else the wedging of the bar into the tapered socket of the head may burst the latter if it is not made very massive. On the other hand, when the bar is so fitted to the head as to rest on the bottom of the socket the various unequal strains of the blows will soon cause lateral play of the bar in the socket. This makes the use of keys indispensable for securing the hammer-head in place and to compensate for the wear of the bearing-surfaces; but the key-ways, cut transversely into the bar for the admission of these keys, must necessarily weaken the bar at the point subjected to the severest strains, and in either of these cases the possibility of any adjustment of the head about the axis of the bar is precluded. A plan heretofore adopted for overcoming some of the defects of the above-described fastening has been to forge a massive head on the lower end of the hammer-bar, in which a transverse dovetailed recess was provided, and in this recess the hammer-face, provided with corresponding projections, was secured by keys; but this arrangement, although abundantly strong and efficient for the purpose, does not admit of any adjustment about the axis of the bar, and it necessitates a very objectionable feature in the construction of other parts of the hammer—that is to say, the lower cylinder-head and its stuffing-box, in which the part of the hammer-bar below the piston is guided, can only be put together in halves or sections to get them into their places between the piston and hammer-head. This is a very expensive and practically an objectionable arrangement, as these parts are subject to much strain and wear, and, when made in sections, are very liable to be deranged or broken, whereas when the hammer-head is made separate from the bar the lower cylinder-head may be cast on the cylinder, thereby increasing the strength, with diminished metal, and a single packing-follower may be put in place, surrounding the lower cylindrical part of the hammer-bar.

In the accompanying drawing, Figure 1 is a side elevation, partly in section, of my improved steam-hammer; Fig. 2 is a side view of the lower end of the hammer-bar, its head, and its face, at right angles to Fig. 1; Fig. 3 is a plan of Fig. 2; Fig. 4 is a plan of the die or hammer-face detached; Fig. 5 is a sectional plan through the line $x\ y$ of Fig. 1.

That part of the hammer which constitutes, as hereinbefore set forth, the hammer-bar or piston-rod, and which delivers the blow, consists of the upper or guiding piston-rod A, the piston B, and the lower piston-rod C, united in one piece. The piston B may be made solid with the hammer-bar, or the bar may be tapered under the piston, which may then be shrunk on and thus securely united to the bar. This piston fits loosely in the cylinder, and is packed steam-tight by two or more rings of square steel bent to the shape of the cylinder, but the ends not united. These are arranged to press up against the interior of the cylinder by their own elasticity when they are inserted in the grooves $c\ c$ in the piston B. Upon the lower end of the piston-rod C I secure, as hereinafter described, a heavy ring or hammer-head, D, which projects beyond and below the face of the bar. In the face of this head D I make a transverse recess, with dovetailed jaws $d\ d'$, between which the hammer face or die E, having conformably-beveled sides, is secured and held in the recess by means of a flat key, $e$, interposed between the face E and jaw $d$. A short stud or block, $f$, projects from the side of the die or hammer face E and takes into a corresponding recess in the jaw $d'$ of the recess, thus preventing end motion of the face within the jaws. It is obvious that this block and recess may be transposed without changing the operation of either. With this relation of the parts thus maintained the direct force of the blow is delivered by the bottom or flat end of the hammer-bar, which is entirely covered by the die or hammer face E, which also bears at opposite ends against the under side of the recessed surfaces of the head D. This head or ring D is slipped over the lower end of the hammer-bar and securely united with it by means of a slightly-tapered sleeve, $g$, interposed between the head and the bar. The sleeve is cut through lengthwise at $i$, Fig. 2, and is largest at the top, its outer surface having a downward taper of about one degree on a side. The outer ring or head D is bored to a conformable size and taper, and when it and the required face are adjusted in the proper relation to the hammer-bar the split sleeve $g$ is driven downward into place and the connection thus made secure. When thus secured the momentum of the ring $g$ tends to tighten its hold upon the hammer-bar at every blow of the hammer.

As there are no key ways or cuts in the bar of any kind, it is evident that this method of fastening does not in any way reduce the mass or diminish the strength of the bar, and does permit the adjustment of the hammer head and face about the axis of the bar. Ordinarily, the hammer-faces may be detached and changed by driving out the flat key $e$; but when the head D is to be detached from or adjusted about the axis of the bar the face is first removed, and a blow or two of the hammer-bar upon a block of smaller diameter will jar the ring or head D off the downward-tapered sleeve $e$, and so at once separate both from the bar.

On reference to Fig. 1, that part of my invention relating to an increase of durability of the hammer-bar will be fully understood. In order to approach as near as possible the pyramidal form best adapted to resist the effects of the blow, the lower part C of the piston-rod or hammer-bar is made as massive and large in diameter as is consistent with the required weight and piston area, while the upper end A of the bar is reduced to a much smaller diameter, the reduction being only limited by the strength required in this part for resisting the lateral and torsional strains of the blow. The means represented in the drawing for preventing any turning of the hammer-bar on its axis consist of two feathers, $j\ j$, Fig. 5, secured in the upper cylinder-cover H of the guiding piston-rod A, or upper end of the hammer-bar, which fit snugly in conformable guide-recesses in the piston-rod A. The manner of guiding the bar to resist torsional strains may, however, be modified by making the upper part A of the hammer-bar of rectangular section, or by forming one or more flat sides on the same; but such modification of the sectional form of the part A does not change my invention, and I therefore do not limit myself to the arrangement of guiding-surfaces shown in the drawing.

I claim as my invention, and desire to secure by Letters Patent, as improvements in steam-hammers—

1. The hammer-bar constructed as herein described—that is to say, solid as distinguished from tubular, massive and of large diameter below the piston, and less massive and of less diameter above the piston—jointly with a packed piston, a cylinder, and devices above and below the cylinder to guide the bar independently of the cylinder and piston.

2. The combination of the hammer-bar, the sleeve, the detachable and adjustable hammer-head D, and the die or hammer face E, all these members being constructed to operate as set forth.

In testimony whereof I have hereunto subscribed my name.

WM. SELLERS.

Witnesses:
CYRUS BORGNER,
H. A. FULTON.